US012591373B2

(12) United States Patent
Ulusoy et al.

(10) Patent No.: US 12,591,373 B2
(45) Date of Patent: Mar. 31, 2026

(54) RELIABLE FLASH STORAGE

(71) Applicant: Google LLC, Mountain View, CA (US)

(72) Inventors: Mehmet Alphan Ulusoy, Framingham, MA (US); Christopher J. Frantz, Sunnyvale, CA (US); Miguel Angel Osorio Lozano, El Dorado Hills, CA (US)

(73) Assignee: Google LLC, Mountain View, CA (US)

( * ) Notice: Subject to any disclaimer, the term of this patent is extended or adjusted under 35 U.S.C. 154(b) by 50 days.

(21) Appl. No.: 18/700,027

(22) PCT Filed: Oct. 11, 2022

(86) PCT No.: PCT/US2022/077916
§ 371 (c)(1),
(2) Date: Apr. 10, 2024

(87) PCT Pub. No.: WO2023/064776
PCT Pub. Date: Apr. 20, 2023

(65) Prior Publication Data
US 2024/0338127 A1 Oct. 10, 2024

Related U.S. Application Data

(60) Provisional application No. 63/256,315, filed on Oct. 15, 2021.

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC .... G06F 3/0619; G06F 3/0659; G06F 3/0679; G06F 2212/7202; G06F 12/0246
See application file for complete search history.

(56) References Cited

U.S. PATENT DOCUMENTS

| | | | |
|---|---|---|---|
| 2009/0287874 A1 | 11/2009 | Rogers et al. | |
| 2010/0106753 A1* | 4/2010 | Prabhakaran | G06F 3/065 |
| | | | 707/E17.001 |

(Continued)

FOREIGN PATENT DOCUMENTS

| | | |
|---|---|---|
| CN | 102567216 A | 7/2012 |
| CN | 108710578 A | 10/2018 |

(Continued)

OTHER PUBLICATIONS

"International Search Report and Written Opinion", Application No. PCT/US2022/077916, Jan. 26, 2023, 9 pages.

(Continued)

*Primary Examiner* — Hiep T Nguyen
(74) *Attorney, Agent, or Firm* — Colby Nipper PLLC

(57) ABSTRACT

This document describes techniques and apparatuses for reliable Flash storage, which may enable reliable read, write, and erase operations for Flash storage. In aspects, data may be stored in a Flash memory device through the use of two or more pages. A primary page may be determined from the two or more pages as an appropriate page to perform storage operations. An empty entry may be determined within the primary page and data may be stored within the empty entry. After data is written to an entry, previous entries may be invalidated, such as to prevent the access or attempted use of invalid or deprecated data. In doing so, prior entries may only be altered once a new entry has been stored within the Flash device. Accordingly, the described techniques and apparatuses may enable reliable Flash storage.

19 Claims, 10 Drawing Sheets

600

| Page 402 | Page 404 | Primary Page |
|---|---|---|
| X | Y | Page 402 |
| X | X | Page 404 |
| Y | X | Page 402 |
| Y | Y | Page 404 |
| {Back to the first row} | | |

(56)                References Cited

U.S. PATENT DOCUMENTS

| | | | | |
|---|---|---|---|---|
| 2010/0250875 A1* | 9/2010 | Leung | ................. | G11C 16/102 |
| | | | | 711/155 |
| 2014/0075093 A1 | 3/2014 | Wiesner et al. | | |
| 2017/0046090 A1 | 2/2017 | Zhu et al. | | |
| 2020/0133490 A1* | 4/2020 | Leitao | .................... | G06F 3/064 |
| 2020/0202944 A1 | 6/2020 | Mondello et al. | | |
| 2021/0011845 A1 | 1/2021 | Huang | | |
| 2021/0133389 A1 | 5/2021 | Bischoff et al. | | |
| 2021/0182190 A1 | 6/2021 | Gao et al. | | |

FOREIGN PATENT DOCUMENTS

| | | |
|---|---|---|
| JP | 2009521045 A | 5/2009 |
| WO | 2023064776 | 4/2023 |

OTHER PUBLICATIONS

"UM11295 LPC55S1x/LPC551x User manual", Accessed online at: https://www.mouser.com/pdfDocs/UM11295.pdf on Aug. 20, 2021, Feb. 22, 2020, 1144.

"International Preliminary Report on Patentability", Application No. PCT/US2022/077916, Apr. 16, 2024, 6 pages.

"Foreign Office Action", JP Application No. 2024-521151, Jun. 10, 2025, 8 pages.

"Foreign Office Action", IN Application No. 202447027028, Jul. 8, 2025, 8 pages.

"Foreign Office Action", EP Application No. 22800543.5, Nov. 7, 2025, 7 pages.

* cited by examiner

200

114

| Host |
| --- |
| 202 |

| Flash Bank |
| --- |
| 206 |

| Flash Reliability Manager |
| --- |
| 116 |

| Flash Physical Controller |
| --- |
| 204 |

| Page 0 | Page 0 | Page 0 |
| Page 1 | Page 1 | Page 1 |
| ○ ○ ○ | ○ ○ ○ | Page 2 |
| Page N | Page N | ○ ○ ○ |
| Information Partition 302 | Information Partition 304 | Page N |
| | | Data Partition 306 |

Flash Bank 206

400

| Entry 0 |
|---|
| Entry 1 |
| ... |
| Entry N |

Page
402

| Entry 0 |
|---|
| Entry 1 |
| ... |
| Entry N |

Page
404

500

600

| Page 402 | Page 404 | Primary Page |
|----------|----------|--------------|
| X | Y | Page 402 |
| X | X | Page 404 |
| Y | X | Page 402 |
| Y | Y | Page 404 |
| (Back to the first row) | | |

700

800

| |
|---|
| Used (counter: 0) |
| Used (counter: 1) |
| Used (counter: 2) |
| empty |

Page
402

Determine a primary page of the
pages of the Flash memory
1002

Determine a last valid entry
within the primary page
1004

Output a data structure stored
within the last valid entry
1006

RELIABLE FLASH STORAGE

RELATED APPLICATION(S)

This application is a national stage entry of International Application No. PCT/US2022/077916, filed Oct. 11, 2022, which claims the benefit of U.S. Provisional Application No. 63/256,315, filed Oct. 15, 2021, the disclosures of which are incorporated herein by reference in their entirety.

BACKGROUND

Electronic devices are continually used to perform tasks of increased complexity and importance. As a result, electronic devices require the implementation of robust, high-performing memory devices. Today, many electronic devices utilize Flash memory as a non-volatile storage medium. Many Flash memory devices, however, possess limitations, such as a write endurance that defines the number of program and erase operations that can be performed before damaging a flash memory device. Moreover, in some circumstances, data stored within a Flash memory device may become corrupted during variable power events, such as power loss during a storage operation. Events such as these can permanently compromise data integral to the operation of the electronic device. Accordingly, memory failures can harm electronic devices, and in some instances, render electronic devices unusable.

SUMMARY

This document describes techniques and apparatuses for reliable Flash storage, which may enable reliable read, write (e.g. program), and erase operations for Flash storage. In aspects, data may be stored in a Flash memory device through the use of two or more pages. A primary page may be determined for the two or more pages to determine an appropriate page to perform storage operations. An empty entry may be determined within the primary page and data may be stored within the empty entry. After data is written to an entry, previous entries may be invalidated, such as to prevent the access or use of invalid or deprecated data. In doing so, prior entries may only be altered once a new entry has been stored within the Flash device. Accordingly, the described techniques and apparatuses may enable aspects of reliable Flash storage.

A method is described which includes storing data within a page of two or more pages of a Flash memory. Storing the data includes determining a primary page of the two or more pages of the Flash memory. A first empty entry within the primary page may be determined and data (e.g., boot code, boot data, data structure, etc.) may be stored within the first empty entry of the primary page. In some cases, this ensures that the previous data in the primary page is available in the event of a write failure when the new or updated data is written to an empty entry in the primary page.

In aspects, a Flash reliability manager is also described that is implemented in a computer-readable storage media that may be executed by a processor to perform the method or other operations for reliable Flash memory. In other aspects, a system that includes a Flash memory and the Flash reliability manager configured to implement aspects of reliable Flash memory is further described in this document.

This Summary is provided to introduce simplified concepts of techniques and apparatuses for reliable Flash storage, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of reliable Flash storage are described below. The use of the same reference numbers in different instances in the description and the figures indicate similar elements.

DETAILED DESCRIPTION

Overview

Figure 1:
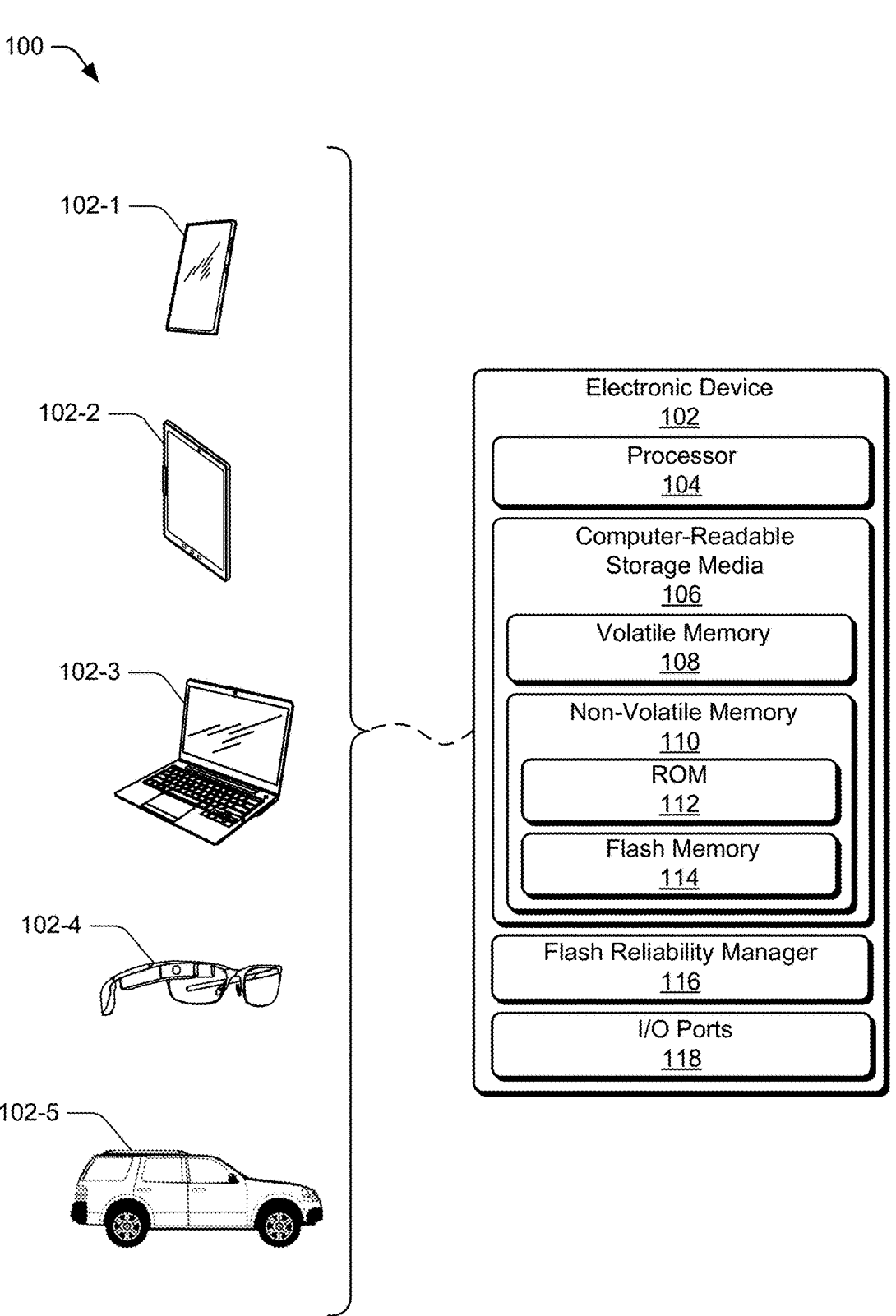
FIG. 1 illustrates an example operating environment in which reliable Flash storage can be implemented in accordance with one or more aspects.

This document describes techniques and apparatuses for reliable Flash storage. Many electronic devices may utilize Flash memory to store data useful for device operations. When provisioned, Flash memory contains pages, each including a set number of bits initialized to a value of one. Through write operations, a bit may be programmed from a one to a zero. To program a bit with a value of zero back to a value of one, however, an erase operation is utilized. Erase operations cannot be performed on individual bits, instead, erase operations program all bits within a page (or bank) of Flash memory to a value of 1, which over time may damage the Flash device. Additionally, Flash devices may experience power loss during a write or erase operation, corrupting the data being written or erased. To limit damage to the Flash device and provide a robust solution for storing data in Flash memory, reliable Flash storage is needed.

Reliable Flash storage is described herein which utilizes at least two pages in an append-only fashion to store data within Flash memory. Generally, Flash memory may be accessed through three operations: read, write, and erase. A read operation may retrieve data stored in Flash memory and output the content to be utilized by another device. A write operation may determine an appropriate entry in which to store the data by programming appropriate bits of the entry to zero. An erase command may reprogram all bits within a page (or a bank or block) back to a value of one. To provide reliable Flash storage, two or more pages are used to assure a previous entry is maintained until a new entry is written. As such, even in the event of data corruption, the previous entry may remain available to read. Additionally, a primary page in which read and write operations should be undertaken may be determined between the two pages. Data structures (e.g., boot code, boot data, etc.) may be written to entries within each page and set to valid or invalid status. In aspects, the primary page may be determined through a counter scheme or a state scheme. The counter scheme may utilize a counter field within each data structure to determine the page that includes a valid entry with the highest data structure counter field. The state scheme may utilize a storage space within each page in which a state of the page is stored. Based on the state of each page, the primary page may be determined. As such, write and read operations may be performed on the primary page that minimizes the computation required to determine appropriate interaction with the Flash memory.

For reliable Flash storage, write operations may be performed on a first empty entry within the primary page. The write operation may additionally set previous entries to invalid by altering a field of a data structure stored within the previous entry, e.g., by setting all or some bits of a field of a data structure that is known to have at least one non-zero bit to zero. In doing so, valid entries may be found easier, and thus, the primary page may be determined through fewer computations. Additionally, when the primary page is changed from a first page to a second page, e.g., because the primary page is full, the second page may be erased to make space for the new entry without modifying the previous entry in the first page. In aspects, reliable Flash storage, as described, is performed by a Flash reliability manager that is operably coupled with a Flash memory.

The described aspects may provide one or more advantages of preceding techniques of Flash memory writing. For example, reliable Flash storage may provide a chance to recover from write failures since the previous entries are invalidated only after a successful write or provide a chance to recover from erase failures without requiring falling back to default values. Additionally, the aspects may perform 1 erase every N writes as opposed to 1 erase per write, reducing the possibility of data corruption due to power failures. Alternatively or additionally, erase cycles are distributed across at least two info pages, resulting in reduced flash wear. These are but a few example aspects and advantages provided by reliable Flash storage, others of which are described throughout this disclosure.

FIG. 1 illustrates an example operating environment 100 for reliable Flash storage in accordance with one or more aspects. For example, reliable Flash storage may be performed within an electronic device 102 such as a mobile device 102-1, a tablet 102-2, a personal computer 102-3, a wearable computing device 102-4, or a vehicle 102-5 (e.g., vehicle navigation, control, or entertainment system). Although not shown, other configurations of an electronic device 102 are considered such as a desktop, a server, a printer, a digital camera, a gaming console, a home automation terminal, a mobile hotspot, a security chip, and the like.

In aspects, an electronic device 102 capable of implementing reliable Flash storage includes a processor 104 and computer-readable storage media 106. The computer-readable storage media 106 may be implemented within or in association with the processor 104, for example, as a system-on-chip (SoC) or another form of an internal or embedded system that provides processing or functionalities of the electronic device 102. Alternatively, the computer-readable storage media 106 may be external but associated with the processor 104. The computer-readable storage media 106 include volatile memory 108 and non-volatile memory 110, which may include any suitable type, combination, or number of internal or external memory devices. Each memory of the computer-readable storage media 106 may be implemented as an on-chip memory of hardware circuitry or an off-chip memory device that communicates data with the processor 104 via a data interface or bus. In one example, volatile memory 108 includes random access memory (RAM). Alternatively, or additionally, volatile memory 108 may include other types of memory, such as static random-access memory (SRAM), synchronous dynamic random access memory (DRAM), asynchronous DRAM, double-data-rate RAM (DDR), and the like.

Further, non-volatile memory 110 includes Flash memory 114 and may additionally include read-only memory 112 (ROM 112), any of which may be used to store separate code partitions with varied security requirements. Other non-volatile memory not shown may include non-volatile RAM (NVRAM), electrically erasable programmable ROM (EEPROM), embedded multimedia card (eMMC) devices, single-level cell (SLC) Flash memory, multi-level cell (MLC) Flash memory, and the like. In one example, ROM 112 is implemented as on-chip memory areas. Boot code may be stored in one or more non-volatile memory components, such as Flash memory 114 and ROM 112. In a specific example, the lowest level of boot code is written or masked in ROM 112. By doing so, the boot code in the ROM 112, or the metal-mask ROM/boot-ROM, cannot be modified after the chip is manufactured. The non-modifiable nature of ROM 112 provides an assurance of authenticity in the lowest level boot code. Higher-level boot code can be implemented in extensions of the ROM 112, such as Flash memory 114.

A Flash memory 114 may be implemented through a Flash bank including multiple partitions, each accessible to different systems of the electronic device 102. In some implementations, the Flash memory 114 may include a data partition that holds generic data and an information partition that holds metadata about the data partition and design-specific secret data. The Flash memory 114 may have an endurance, and thus, support modification through a number of write and erase commands. Further, the Flash memory 114 may support read commands that output the data stored within Flash memory 114.

The electronic device 102 additionally includes a Flash reliability manager 116 that enables reliable Flash storage. The Flash reliability manager 116 may be implemented through machine-readable instructions executable by the processor 104. In this implementation, the Flash reliability manager 116 may provide high-level protocol commands, such as read, write, and erase, to a Flash controller in accordance with techniques for reliable Flash storage. As a result, the Flash controller may arbitrate the high-level protocol commands to perform the read, write, and erase operations on the Flash memory 114. In other implementations, the Flash reliability manager 116 may be implemented as hardware within the Flash controller and act to arbitrate the high-level protocol commands to perform reliable Flash storage. As such, the Flash reliability manager 116 may be implemented through any number of fixed logical circuitry, including, but not limited to, Field-programmable Gate Arrays (FPGAs), Application-specific Integrated Circuits (ASICs), Application-specific Standard Products (ASSPs), SoCs, Complex Programmable Logic Devices (CPLDs), and the like.

The electronic device 102 may execute operating systems or applications from any suitable type of computer-readable storage media 106 including volatile memory 108 and non-volatile memory 110. Alternatively, or additionally, operating systems or applications may be embodied as firmware or any other computer-readable instructions, binaries, or code. The electronic device 102 may include a user interface provided by operating systems or applications to allow specific functionality or services of the electronic device 102.

The electronic device 102 may also include I/O ports 118. I/O ports 118 may allow the embedded device 102 to interact with other devices or users, such as the programming of code or values described herein to respective memories, registers, and so forth. I/O ports 118 may include any combination of internal or external ports, such as USB ports, Joint Test Action Group (JTAG) ports, Test Access and Programming (TAP) ports, audio ports, Serial ATA (SATA) ports, PCI-express based ports or card-slots, secure digital input/output (SDIO) slots, and/or other legacy ports. Various peripherals may be operatively coupled with I/O ports 118, such as human-input devices (HIDs), external computer-readable storage media, or other peripherals.

Figure 2:
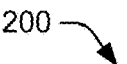
FIG. 2 illustrates an example system including a Flash reliability manager.
Figure 2:
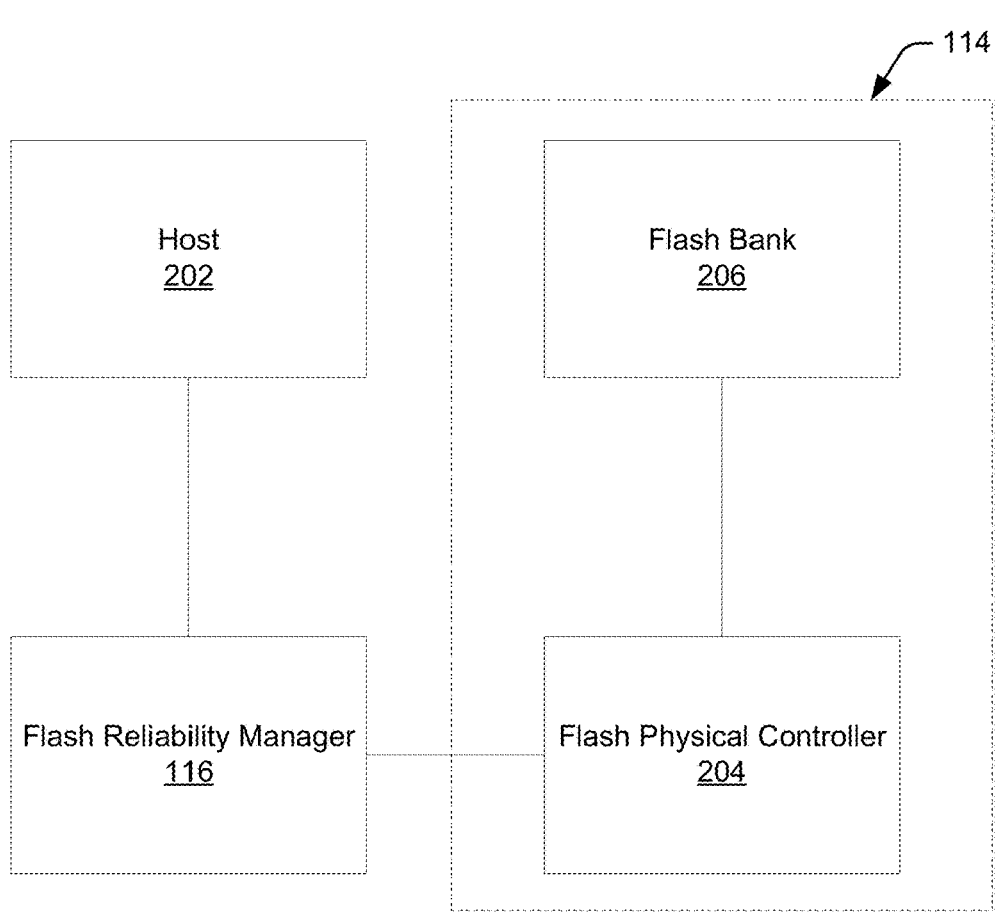

FIG. 2 illustrates an example system 200 including a Flash reliability manager 116. The Flash reliability manager 116 may be disposed between a host 202 software interface, other hardware components, and the Flash physical controller 204. In some implementations, the Flash reliability manager 116 translates read, write, and erase requests from the host 202 into a high-level protocol for the Flash physical controller 204. The Flash physical controller 204 is illustrated as implemented within Flash memory 114, but it may also be external and connected to the Flash memory 114. The Flash physical controller 204 is connected to a Flash bank 206 that includes one or more partitions accessible to various systems within the electronic device. As such, the Flash physical controller 204 may execute the high-level protocol provided by the Flash reliability manager 116 to arbitrate read, write, and erase commands on the one or more partitions of the Flash bank 206. In addition, the Flash physical controller 204 or the Flash reliability manager 116 may be utilized to perform various security functions on the Flash memory 114, such as scrambling or buffering.

Figure 3:
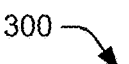
FIG. 3 illustrates an example of a Flash bank within Flash memory.

FIG. 3 illustrates at 300 an example of a Flash bank 206. Flash memory may not be organized as a contiguous block of generic storage but instead, organized into data partitions and information partitions. For example, as illustrated, the Flash bank 206 contains an information partition 302, an information partition 304, and a data partition 306. The data partition 306 may store generic data like a generic memory. Information partition 302 and information partition 304 may store metadata about the data partition as well as design-specific secret data. For example, the information partitions (e.g., information partition 302 and information partition 304) may include, but are not limited to, redundancy information, manufacturer-specific information, manufacturer Flash timing information, design-specific unique seeds, and redundancy pages. Each partition may include or be partitioned into pages, for example, information partition 302, information partition 304, and data partition 306 each contain up to integer N pages that have a set number of entries that can store a set number of words. Each of the words may be made of a set number of bits that determines the word size. In the default state, each bit may be set to a 1. In aspects, the Flash bank 206 may include more than one information partition, none of which are required to be the same size as the data partition 306.

For each type of partition, the page size and word size may be required to be the same, however, each type of partition may include a different number of pages. Thus, one or more of the partitions may be different in size from the other partitions. All types of partitions, however, may follow the same program and erase rules, for example, a bit cannot be programmed back to 1 once it has been programmed to 0 unless an erase command is used. In some aspects, write commands can be bit length operations to program a 1 to a 0, while erase commands must be operated on entire pages or banks to erase all programmed bits with a value of 0 to 1. Alternatively or additionally, write operations may be performed at any suitable granularity, such as write operations implemented as one or more of bit length operations, nibble length operations, byte length operations, word length operations, and so forth. In some cases, data partitions may be directly read by software and other hardware hosts, while information partitions may only be read by the Flash controller (e.g., Flash physical controller 204).

In one implementation, information partition 302 and information partition 304 hold secret seeds to implement a secure boot process. The pages incorporated within the information partitions may be read upon initialization of the Flash controller. The read values from the pages may then be fed to be used as part of an electronic system's secure boot process. In some implementations, a secure boot process may involve creator secrets (from a manufacturer or designer of a silicon device) and owner secrets (from a purchaser or an entity who is authorized by the creator (or a previous owner) to execute code on the device). As such, information partition 302 or information partition 304 may include a creator page and an owner page.

In aspects, an entry may be implemented as shown in example data structure 1, with one or more fields for a digest, identifier, counter, security version value, or the like. The entry may be fixed-size (e.g., a multiple of the word size) or integrity protected.

| Example Data Structure 1 |
|---|
| typedef struct boot_data {<br>    hmac_digest_t digest;<br>    uint32_t identifier;<br>    uint32_t counter;<br>    uint32_t min_security_version_rom_ext;<br>    // Other data (or padding)<br>    // ...<br>} |

Figure 4:
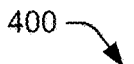
FIG. 4 illustrates an example Flash memory including multiple pages in accordance with one or more aspects of reliable Flash storage.

FIG. 4 illustrates an example Flash memory 400 including multiple pages in accordance with one or more aspects of reliable Flash storage. For example, page 402 and page 404 are used as append-only logs in order to be able to recover from interrupted write and erase operations. The data may be packed into a single data structure, and each page may store an integer, N, entries determined by the size of this data structure and the page size. At a point in time, one of page 402 and page 404 will be the primary (or active) page while the other will be the secondary (or inactive). The primary page may be used to read from and write to until it is full. If a new entry needs to be stored when the primary page is full, the secondary page may be erased and the new entry may be written to the freshly erased page. Upon validation of the new entry, the primary and secondary pages may be switched. In other words, if the primary page is full (e.g., all entries filled), the secondary page is erased, and a new entry is written to the freshly erased page. Upon validating the new entry, the respective role or status of the primary page and secondary page are switched (e.g., the previously erased page is now the primary page). It should be noted that validation of the new entry may be performed in a number of various ways, e.g. by reading back the newly written entry and comparing its contents with the expected values or by monitoring the error status of the flash controller.

In order to be able to verify the integrity of the entries, the stored data structure may have a digest (or checksum) field. In some implementations, the digest may be usable to determine the validity of an entry. For example, the digest may be validated to determine that an entry is valid. If, however, the digest is not validated, the entry may be considered invalid. In aspects, an identifier field with a non-trivial value may be used to be able to quickly determine invalid or empty entries before the full integrity and empty check as an optimization. In aspects, the identifier field may be a predetermined constant value across each entry. Alternatively, the identifier field may be unique for each entry or differ based on entry type.

Figure 5:
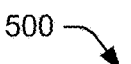
FIG. 5 illustrates an example counter implementation for primary page determination in accordance with one or more aspects.
Figure 5:
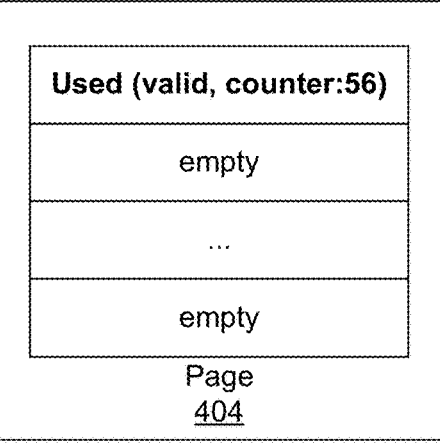

FIG. 5 illustrates at 500 an example counter scheme for primary page determination in accordance with one or more aspects of reliable Flash storage. As described above, the counter scheme may utilize at least two pages in an append-only fashion (e.g., the pages illustrated as page 402 and page 404). Each of page 402 and page 404 may contain a set number of entries that may be written to and set to valid or invalid. Each entry may have a counter field that is incremented at each write. At each write, an entry may be filled and set to valid. Additionally, each other entry, or the previous entry, may be set to invalid. To determine the primary page, the valid entries in each page may be found and then compared based on values of their counter fields, and the page with the higher counter value may be determined as the primary page. Alternatively, the last valid entry in each page may be found and then compared based on values of the counters.

For example, page 402 contains no empty entries and similarly, contains no valid entry. Page 404, however, contains a valid entry with a counter value of 56. As a result, entries are set to invalid as part of a write command, the Flash memory may be corrupted during the setting of the validity field of the previous entry. As a result, the previous entry may not be marked as invalid. In this case, each valid entry may be compared based on the counter value to determine the primary page. In another implementation, previous entries are not set as invalid. In this implementation, page 402 and page 404 may both contain valid entries. The valid entries may be compared, and the valid entry with the highest counter value will determine the primary page. Specifically, the primary page will be the page that contains the entry with the highest counter value. If there are no valid entries, it may be determined that the pages need to be initialized, e.g., erased. If a read request is received before initialization, a default value may be returned. This behavior may further be controlled, allowed, or disallowed based on the life cycle state of the device, one-time-programmable (OTP) memory configuration, or other configuration. Initialization may include a default primary page, such as page 402 or page 404. The counter scheme may be advantageous for reliable Flash storage due to its simplicity, as it only uses a simple counter field within each entry. Alternatively, reliable Flash storage may be performed through a state scheme.

Figure 6:
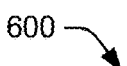
FIG. 6 illustrates an example state scheme for primary page determination in accordance with one or more aspects of reliable Flash storage.

FIG. 6 illustrates at 600 an example state scheme for primary page determination in accordance with one or more aspects of reliable Flash storage. The state scheme may utilize two append-only pages as in the counter scheme. As illustrated, the state scheme includes page 402 and page 404. Each page may have a reserved area to store the state of the pages. A redundant encoding may be used that utilizes two constants X and Y as illustrated in FIG. 6. Each of the constants, X and Y, may be used to represent a state of the page in which it is stored.

The first four rows illustrated in FIG. 6 list the states of the pages in the order into which they may transition. Additionally, the state that will be updated in the next row is highlighted. For example, assuming that the values of the state areas of the pages are X and Y (first row), and page 402 (the primary page) is full, page 404 is erased and its state area is set to X, making it the primary page (second row). If this operation is interrupted, the state of the pages can still be reliably determined since the current primary page is not modified during this operation. When both pages are in the X state (second row), page 404 may be written to as the primary page. When page 404 is full, page 402 may be erased and its state may be changed to Y, making page 402 the primary page (third row). Similarly, page 402 may be written to as the primary page until it is full. Once it is full, page 404 may be erased and its state may be changed to Y, making page 404 the primary page (fourth row). Page 404 may be written to as the primary page until it is full, at which point page 402 may be erased and its state may be set to X. This may cause page 402 to be determined as the primary page, starting the cycle over.

When a primary page is determined, the primary page may be written to without modifying existing entries. If the primary page is full, the secondary page may be erased and the secondary page may be written to as the primary page. Accordingly, the previous entry may not be cleared or invalidated until the new entry is written, thus providing reliable Flash storage. It should be noted that determining the primary page and erasing a page may be implemented in any order. For example, the primary page may be determined to be full. The secondary page may be determined as the primary page and then deleted. Alternatively, the secondary page may be deleted and then determined as the primary page. It should be noted that the state scheme may not require any additional fields in the entries and does not need to scan through the second page to determine the primary page. For ease of description, the various operations (read, write, and erase) are described in the context of the counter scheme. However, it should be appreciated that each of the read, write, and erase operations may be performed in accordance with the state scheme by implementing a state for each page in lieu of, or in addition to, the counter field.

Figure 7:
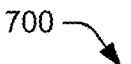
FIG. 7 illustrates an example implementation of a write operation in accordance with one or more aspects.
Figure 7:
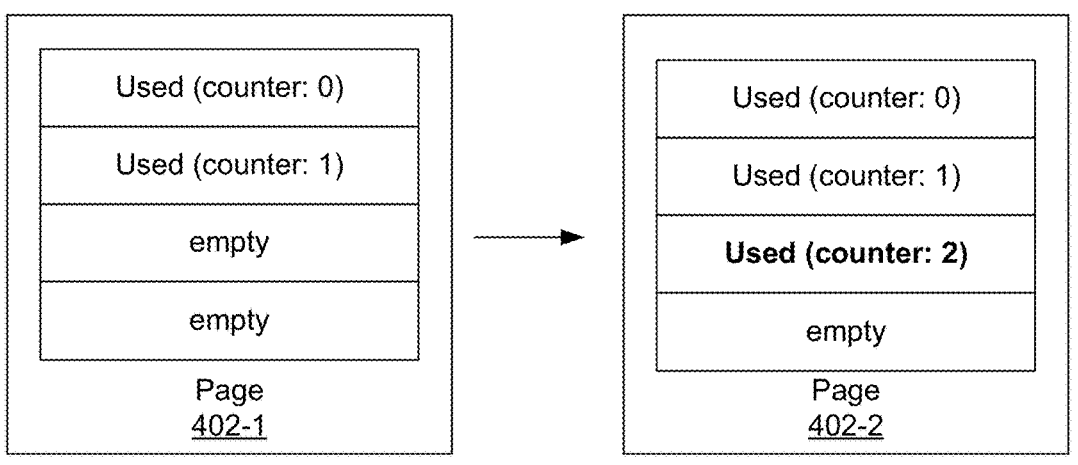

FIG. 7 illustrates at 700 an example implementation of a write operation in accordance with one or more aspects of reliable Flash storage. Page 402 is illustrated before (e.g., page 402-1) and after (e.g., page 402-2) a write operation takes place. A write operation may write a new data structure in the first empty entry in the primary page (e.g., the first entry whose bits are all 1). In some aspects, this may be implemented as a simple linear search since the number of non-empty entries is expected to be small. Alternatively, a binary search, or any other appropriate search algorithm, may be used to determine the first empty entry in the primary page. Note that the entries do not have to be unique and the same entry may be written multiple times for redundancy. If the primary page has no empty entries left, then the secondary page may be erased before the new data structure can be written. Upon validation of the new entry, the primary and secondary pages may be switched. Once the new entry is written, the previous entry may be invalidated (e.g. by writing all 0s to a field of the struct) to avoid falling back to stale information. In some implementations, the identifier field may be written to 0. If the write operation is interrupted, the previous entry may still be valid since it is invalidated only after the new entry is successfully written. In an example write operation, the search may determine the first empty entry in page 402-1 and the write command may write a new data structure containing an incremented counter to the empty entry, which results in page 402-2. In state schemes, the write operation may include updating the state of each page when necessary.

Figure 8:
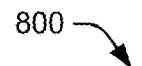
FIG. 8 illustrates an example implementation of a read operation in accordance with one or more aspects of reliable Flash storage.

FIG. 8 illustrates at 800 an example implementation of a read operation in accordance with one or more aspects of reliable Flash storage. In FIG. 8, page 402 is the primary page and contains at least one valid entry. A read operation may return the last valid entry in the primary page. Similar to the write operation, the read operation should first search for the first empty entry in the page, and a backward search may be performed to find the last valid entry. If the page has no empty entries, the backward search may begin from the last entry in the page. As a result, the read operation may find the last valid entry even if previous entries are not updated to invalid. A page may include no valid entries, for example, before the page has been written to. In the absence of valid data, default values may be used based on the lifecycle state or another configuration, e.g., OTP fuses, of the electronic device. For example, in a manufacturing state, a lifecycle state may determine corresponding default values to enable manufacturing use cases. In another implementation, a single default configuration may be used.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
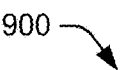
FIG. 9 illustrates an example method for a write operation in accordance with one or more aspects of reliable Flash storage.
Figure 9:
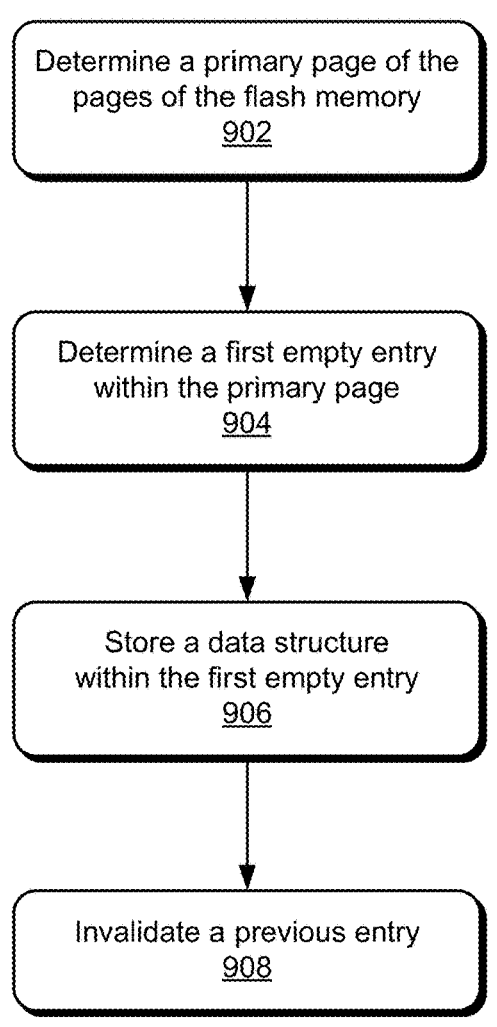

FIG. 9 illustrates an example method 900 for a write operation in accordance with one or more aspects of reliable Flash storage. At 902, a primary page of two or more pages of the Flash memory is determined. In aspects, the primary page is determined using the counter scheme or the state scheme detailed above. In some implementations, storing the data within a page of the two or more pages of Flash memory includes, after determining the primary page, determining whether the primary page is full. In response to determining that the primary page is full, another page of the two or more pages may be erased. The other page may then be used to store the data within its first empty entry and may be determined as the primary page. In some cases, this prevents the data from being erased until new or updated data for the entry is written to a different page of Flash memory, ensuring the data is available in the event of erase or write failures when storing the data to the new primary page of Flash memory.

In some implementations, a counter scheme may be used to indicate and enable determination of the primary page from multiple pages of Flash memory. For example, the data may be written or formatted as a data structure that includes a counter field, and storing the data structure (e.g., valid data struct or valid struct) may involve setting the counter field of the valid data structure by incrementing a counter field of a data structure stored within a previous entry (e.g., a monotonically increasing counter to indicate valid entries). In some implementations, a previous entry may not exist. As such, a default value may be written to the counter field. In the counter scheme, the primary page may be identified by determining a first valid entry within a first page of the two or more pages and at least one second valid entry within at least one second page of the two or more pages. To determine the primary page, the first valid entry and the at least one second valid entry may be compared based on the counter field of the data structure stored within each of the first valid entry and the at least one second valid entry. In some implementations, multiple valid entries may be present on a page. As such, the last valid entries from each page may be used to determine the primary page.

In some implementations, a state scheme is utilized to determine the primary page of Flash memory. For example, each page of the two or more pages of Flash memory may include a state field used to store a state of each page. The primary page may be determined based on the state field of each of the two or more pages. In an aspect, an initial primary page is determined based on the state field of each of the two or more pages and the primary page is searched to determine if the page includes an empty entry. If it is determined that the primary page does not include an empty entry (e.g., is full), another page of the two or more pages different from the initial primary page is determined as the primary page. In some implementations, the other page is erased in response to determining that the initial primary page is full. In an aspect, the state field of the other page is altered in response to erasing the other page. In some implementations, the valid data is stored within the first empty entry of the other page using the other page as the primary page.

At 904, a first empty entry within the primary page is determined. At 906, a valid data structure is stored within the first empty entry. In some implementations, the valid data structure may contain a digest, an identifier field, or a counter field. At 908, a previous entry may be set to invalid in response to the valid data structure being stored within the first empty entry. A previous entry may be set to invalid by altering a field within a data structure stored within the previous entry. In a specific example, a field, or some parts of it, may be altered to zeros. In an aspect, the identifier field may be adjusted to set the previous entry to invalid, as it may be known that the identifier field is non-zero.

Figure 10:
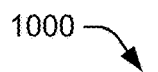
FIG. 10 illustrates an example method for a read operation in accordance with one or more aspects of reliable Flash storage.
Figure 10:
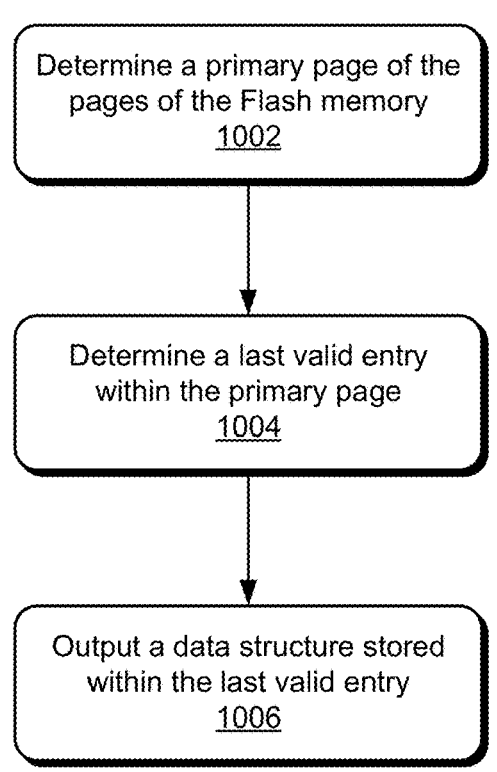

FIG. 10 illustrates an example method 1000 for a read operation in accordance with one or more aspects of reliable Flash storage. At 1002, a primary page of two or more pages of the Flash memory is determined. In general, this determination may be similar to the primary page determination made at 902 of FIG. 9.

At 1004, a last valid entry within the primary page of the two or more pages may be determined. The last valid entry may be determined based on any of the data stored within the Flash memory. For example, the counter, the digest, or the identifier field may be used to determine the last valid entry. At 1006, a data structure stored within the last valid entry may be output. In general, the output may include the entire data structure or a portion of the data structure. In general, however, a read operation may enable data to be retrieved from the Flash storage.

Generally, the method described above may be implemented, in whole or in part, by a Flash reliability manager. In doing so, the methods and/or aspects described herein may provide reliable Flash storage, which may be employed to improve data reliability for secure boot operations or other types of Flash memory access.

Examples of reliable Flash storage are provided below:

Example 1: A method comprising: storing data within a page of two or more pages within a Flash memory, the storing comprising: determining a primary page of the two or more pages of the Flash memory; determining a first empty entry of the primary page; and storing a data structure within the first empty entry of the primary page.

Example 2: The method as recited in any one of the previous examples, wherein storing the data within the page of the two or more pages within Flash memory comprises: after determining a primary page of the two or more pages of the Flash memory, determining if the primary page is full; in response to determining that the primary page is full, erasing another page of the two or more pages; storing the data structure within the first empty entry in the other page; and selecting the other page as the primary page.

The method may comprise, after determining the primary page of the two or more pages of the Flash memory, determining if the primary page is full, and in response to determining that the primary page is not full, storing the data structure within the first empty entry of the primary page.

Example 3: The method as recited in any one of the previous examples, wherein the storing the data structure within the first empty entry within the primary page comprises: setting one or more fields of the data structure to indicate validity of the data structure, the one or more fields comprising a digest or an identifier of the data structure; and setting a previous data entry to an invalid state by altering a field of a data structure stored within the previous entry.

Example 4: The method as recited in any one of the previous examples, wherein setting the previous entry to the invalid state comprises: altering an identifier field of the data structure stored within the previous entry to a zero value or another non-zero predefined value configured to indicate the invalid state.

Example 5: The method as recited in any one of the previous examples, wherein: the data structure comprises a counter field; and storing the data structure comprises: setting the counter field of the data structure as an incremented value from a value of a counter field of another data structure stored within a previous entry; or in response to determining that there is no previous entry, setting the counter field of the data structure as a default value.

Example 6: The method as recited in any one of the previous examples, wherein the determining the primary page comprises: determining a first valid entry within a first page of the two or more pages of Flash memory; determining at least one second valid entry within at least one second page of the two or more pages of Flash memory; and determining the primary page of the Flash memory based on a comparison of respective counter fields of a data structure stored within the first valid entry and at least one data structure stored within the at least one second valid entry.

Example 7: The method as recited in any one of the previous examples, wherein: each page of the two or more pages of Flash memory comprises a respective state field used to store a state of each page; and determining the primary page within the two or more pages comprises: determining, based on the respective state field of each of the two or more pages, an initial primary page as the primary page; determining whether the initial primary page includes an empty entry; and in response to determining that the initial primary page does not include an empty entry, determining another page of the two or more pages as the primary page, the other page being different from the initial primary page.

Example 8: The method as recited in any one of the previous examples, wherein the state field stores either a first value or a second value different from the first value.

Example 9: The method as recited in any one of the previous examples, further comprising, in response to determining the other page as the primary page, altering the state field of the other page to indicate the other page as the primary page of the two or more pages of Flash memory.

Example 10: The method as recited in any one of the previous examples, further comprising erasing the other page in response to determining the other page as the primary page and storing the data structure within the first empty entry within the primary page.

Example 11: The method as recited in any one of the previous examples, further comprising: reading data from the primary page of the two or more pages of the Flash memory, the reading comprising: determining a last valid entry within the primary page of the two or more pages; and outputting an indication of a data structure stored within the last valid entry within the primary page.

Example 12: The method as recited in any one of the previous examples, wherein storing the data within the page of the two or more pages of the Flash memory is implemented as a portion of a secure boot process.

Example 13: The method as recited in any one of the previous examples, wherein storing the data within the page of the two or more pages of the Flash memory utilizes the pages as append-only pages.

Example 14: A system comprising: a Flash memory comprising two or more pages; and a Flash reliability manager configured to perform a method recited in any one of the previous examples.

Example 15: An apparatus comprising at least one computer-readable storage medium storing processor-executable instructions that, when executed by at least one processor, directs the at least one processor to perform a method recited in any one of the previous examples. The apparatus may further comprise a Flash memory, and the at least one processor.

Although aspects of reliable Flash storage have been described in language specific to features and/or methods, the subject of the appended claims is not necessarily limited to the specific features or methods described. Rather, the specific features and methods are disclosed as example implementations of the claimed reliable Flash storage, and other equivalent features and methods are intended to be within the scope of the appended claims. Further, various aspects are described, and it is to be appreciated that each described aspect can be implemented independently or in connection with one or more other described aspects.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for reliable Flash storage have been described in language specific to certain features and/or methods, the subject of the appended claims is not necessarily limited to the specific features or methods described. Rather, the specific features and methods are disclosed as example implementations of reliable Flash storage.

What is claimed is:

1. A method comprising
storing data within a page of two or more pages within a Flash memory, the storing comprising:
generating a plurality of state values for the two or more pages, each member of the plurality of state values corresponding with a different one of the two or more pages;
determining, based on the plurality of state values, a primary page of the two or more pages of the Flash memory;
determining a first empty entry of the primary page; and
storing a data structure within the first empty entry of the primary page.

2. The method as recited in claim 1, wherein storing the data within the page of the two or more pages within Flash memory further comprises:
after determining a primary page of the two or more pages of the Flash memory, determining if the primary page is full; and
in response to determining that the primary page is full, erasing another page of the two or more pages.

3. The method as recited in claim 2, further comprising:
storing the data structure within a first empty entry in the other page; and
selecting the other page as the primary page.

4. The method of claim 2, further comprising determining that the other page of the two or more pages is the primary page.

5. The method as recited in claim 1, wherein storing the data structure within the first empty entry within the primary page further comprises:
setting one or more fields of the data structure to indicate validity of the data structure, the one or more fields comprising a digest or an identifier of the data structure.

6. The method as recited in claim 5, wherein storing the data structure within the first empty entry within the primary page further comprises setting a previous data entry to an invalid state by altering a field of a data structure stored within the previous entry.

7. The method as recited in claim 1, wherein:
the data structure comprises a counter field; and
storing the data structure within the first empty entry within the primary page further comprises:
setting the counter field of the data structure as an incremented value from a value of a counter field of another data structure stored within a previous entry; or
determining that there is no previous entry; and in response to determining that there is no previous entry, setting the counter field of the data structure as a default value.

8. The method as recited in claim 7, wherein the determining the primary page further comprises:
determining a first valid entry within a first page of the two or more pages of Flash memory; and
determining at least one second valid entry within at least one second page of the two or more pages of Flash memory
wherein the determining of the primary page of the Flash memory is further based on a comparison of respective counter fields of a data structure stored within the first valid entry and at least one data structure stored within the at least one second valid entry.

9. The method as recited in claim 1, further comprising:
reading data from the primary page of the two or more pages of the Flash memory, the reading comprising:
determining a last valid entry within the primary page of the two or more pages; and
outputting an indication of a data structure stored within the last valid entry within the primary page.

10. The method as recited in claim 1, wherein storing the data within the page of the two or more pages of the Flash memory is implemented as a portion of a secure boot process.

11. The method as recited in claim 10, wherein the Flash memory comprises creator secrets and owner secrets, the creator secrets relating to information from a manufacturer or designer of a silicon device and the owner secrets relating to information from an authorized entity.

12. The method as recited in claim 1, wherein storing the data within the page of the two or more pages of the Flash memory utilizes the pages as append-only pages.

13. The method as recited in claim 1, wherein the Flash memory comprises a data partition and an information partition, the method further comprising:
maintaining, at the Flash memory, a data partition and an information partition.

14. The method as recited in claim 13, wherein the data partition holds generic data and the information partition holds metadata relating to the data partition and design-specific secret data.

15. The method as recited in claim 6, wherein setting the previous entry to the invalid state comprises:
altering an identifier field of the data structure stored within the previous entry to a zero value or another non-zero predefined value configured to indicate the invalid state.

16. The method as recited in claim 1, wherein each page of the two or more pages comprises a set number of bits initialized to a value of one when the Flash memory is provisioned.

17. The method of claim 1, wherein:
each member of the plurality of state values for the two or more pages comprises a binary operator able to take on a first binary value or a second binary value;
the method further comprises generating, for each of the binary operators, either the first binary value or the second binary value; and
the determination of the primary page comprises comparing the plurality of generated values.

18. The method of claim 17, wherein:
the two or more pages within the Flash memory comprises a first page with a first binary operator having a first value and a second page with a second binary operator having a second value; and the determination of the primary page comprises comparing the first value to the second value, wherein the primary page is determined as the first page based on:

the first value comprising the first binary value and the second value comprising the second binary value; or the first value comprising the second binary value and the second value comprising the first binary value; or the primary page is determined as the second page based on:

the first value comprising the first binary value and the second value comprising the first binary value; or the first value comprising the second binary value and the second value comprising the second binary value.

19. The method of claim 1, wherein each of the plurality of state values are stored in a reserved area in each of the two or more pages.

* * * * *